United States Patent [19]

Trop et al.

[11] 4,451,491

[45] May 29, 1984

[54] MIX FOR THE PREPARATION OF BREAD AND CAKE PRODUCTS

[75] Inventors: Moshe Trop; Avinoam Livne, both of Beer Sheva, Israel

[73] Assignee: Ben-Gurion University of The Negev Research and Development Authority, Israel

[21] Appl. No.: 287,179

[22] Filed: Jul. 27, 1981

[30] Foreign Application Priority Data

Jul. 28, 1980 [IL] Israel .................................. 60685

[51] Int. Cl.³ ........................................... A21D 10/00
[52] U.S. Cl. ...................................... 426/555; 426/551
[58] Field of Search ....................... 426/19, 21, 23, 24, 426/62, 550–555, 561, 653–654, 804, 549, 576, 578, 583, 581

[56] References Cited

U.S. PATENT DOCUMENTS

| | | | |
|---|---|---|---|
| 3,513,886 | 5/1970 | Easter et al. | 426/555 |
| 3,574,634 | 4/1971 | Singer | 426/555 |
| 3,676,150 | 7/1972 | Glicksman et al. | 426/62 |
| 3,733,208 | 5/1973 | Sato et al. | 426/550 |

OTHER PUBLICATIONS

Hansen, "The Baking Performance of Butter Powder", The Australian Journal of Dairy Technology, vol. 18, #2, pp. 86–91, Apr.–Jun. 1963.

*Primary Examiner*—Raymond N. Jones
*Assistant Examiner*—Elizabeth A. Hatcher
*Attorney, Agent, or Firm*—Lowe, King, Price & Becker

[57] ABSTRACT

There is provided a mix for the preparation of bread-and-cake type products. The preparation comprises a non-wheat-based starch, a gluten-substitute gum and an emulsified-fat and a powdered whipping agent. The products are produced in a substantial absence of wheat flour.

8 Claims, No Drawings

MIX FOR THE PREPARATION OF BREAD AND CAKE PRODUCTS

The present invention relates to a mix for the preparation of bread- and cake-type products. More particularly the present invention relates to mixes for the preparation of gluten-free bread and cake products produced in the substantial absence of wheat flour.

As is known, bakery products are commonly made from wheat flour containing gluten, which gluten contributes to the typical texture, flavor and form of the usual bread and cake products.

There are however circumstances in which wheat flour is not readily available or cannot be used for the production of baked products.

Thus, e.g., a segment of the population suffers from dietary wheat intolerance which includes disturbances such as classical celiac disease and related, less well defined wheat intolerances and allergies all expressed by gastrointestinal disturbances, which makes wheat based products unacceptable for use.

Similarly, Jewish dietary laws strictly prohibits the common use of wheat flour and its leavened products in Passover.

Furthermore, in developing countries inhabited by more than 2 billion people, wheat is only sparsely grown, often because climate, agronomical practices and/or soil are less suitable for its cultivation. If people in these areas nevertheless wish to change to the consumption of bread, they will need to import wheat and pay for it in foreign currency. This is an adverse economical factor for nearly every developing country.

Thus in consideration of each of the above circumstances it is desirable to develop bread and cake type products which are not based on wheat, however heretofor the development of a wide range of such products has been prevented because of the critical role attributed to gluten in the baking process which baking process will now be briefly explained for a better understanding of the invention as described hereinafter.

In the normal breadmaking process flour, water and yeast are mixed into a dough. In mixing, a quantity of air is entrapped in the dough, where it is divided into a large number of small bubbles. The dough is allowed to rest for a certain time, during which time the yeast generates carbon dioxide gas.

In a wheat flour dough, most of the gas developed by the yeast is retained. It diffuses into the air spaces initially present and makes them expand. As a result, the dough rises. When the increase in dough volume is sufficient, the dough is put in the oven.

Dough volume increases greatly as heat causes expansion of the gas inside said air spaces or cells. Additional expansion comes from the more than linear increase in pressure of water vapor inside the dough as heating causes evaporation.

As long as the entrapped air, the carbon dioxide, and the water vapor are sufficiently retained, the dough volume increases considerably, especially during the first stage of baking known as "oven spring".

Eventually, heat causes changes to occur in the cell wall constituents that permit no further expansion. Also, a crust is formed on the exterior of the loaf, imposing a barrier to expansion. With this, the dough is transformed into a loaf of bread.

If bread with a fine crumb texture is desired, the dough must ultimately contain a large number of gas cells. The larger the number of gas cells, the thinner will be the walls between the cells, and the softer will be the crumb after baking.

If wheat flour is used in the formula, and one of the usual breadmaking procedures is followed, a light structured product is easily obtained. If, however, pure starch or flour from other cereals is taken, the product is considerably more rigid and its texture (cell structure) is irregular, because gas is insufficiently retained in the dough and the gas cells are less stable.

It is a generally accepted view that the outstanding suitability of wheat flour to yield light, evenly structured baked products with a soft crumb from doughs simply made with water and yeast is due mainly to the properties of the proteins of wheat flour that swell with water to give the so called gluten.

According to the present invention it has now been discovered that bread and cake type products having a light and evenly structured fine crumb texture can be produced in the substantial absence of wheat and gluten.

More specifically the present invention provides a mix for the preparation of bread- and cake-type products comprising a non-wheat-based starch, a gluten-substitute gum and an emulsified-fat, powdered whipping agent wherein said products are produced in the substantial absence of wheat flour.

Preferably the starch used in the mix of the present invention is obtained from the group consisting of corn flour, rice flour, soybean flour, potato flour, tapioca flour, cassava flour, sweet potato flour and yams.

The gluten-substitute gum of the mix of the present invention is preferably selected from the group consisting of xanthan gum, guar gum, locust-beam gum, alginate, pregelatinized starch and carboxymethylcellulose and said emulsified fat powdered whipping agent is preferably selected from the group consisting of spray dried margarine, spray dried butter, spray dried cream, vegetable lipid whipping agents and combinations thereof.

It is generally known that differences between various wheat flours are chiefly to be ascribed to the quality and quantity of the gluten. This does not imply, however, that starch, which forms about 70 percent of the flour, does not have an important function in the process of bread-making. On the contrary, the fact that a dough prepared from washed-out gluten, sugar and yeast cannot be made to rise normally would indicate that starch plays an important role also. It is, moreover, an accepted fact that gelatinization of starch constitutes one of the most characteristic processes occurring during baking.

In the literature the impression is often conveyed that the only technological function of starch in dough is to serve as a diluent for the gluten. According to this view the gas retention in dough is effected by the entrapping of gas bubbles by the gluten, whereas the firmness of the bread would be ascribable to the solidifcation of the gluten skeleton. Furthermore, a "dough" consisting only of starch and water cannot be made with regular, dough mixers since these have been adapted to the strongly cohesive and elastic properties of wheat flour doughs.

Already in 1961 there was presented the concept that a dough made from pure starch and water represents a stable suspension. In this suspension, repulsive forces exist between starch granules, which make the suspension show the rheological property of dilatancy. The air entrapped in the dough in the course of mixing and the carbon dioxide developed by the yeast do not find in such a system enough coherent structures to retain them. Part of the gas escapes too early, part of it is retained to form irregular cells.

If, on the other hand, the starch granules in such a concentated suspension are made to attract each other, their mobility decreases. This results in the gas cells now being sufficiently strong to retain the gas, so that the dough can rise more effectively. The end result is a baked product having a greater volume, a softer crumb, and a more regular texture.

The number of cells in the crumb portion of the bread depends, in the first place, on the fineness of distribution of the air that is initially entrapped in the dough during mixing. Yeast in a dough is of itself unable to create gas cells, since a considerable force is required to create a gas hole in a mass as heavy as dough.

If, however, gas cells are already present in the form, e.g., of entrapped air, the carbon dioxide generated by the yeast can diffuse into these cells, and enlargement of these gas cells requires much less pressure than the initial creation of such a cell.

The larger the number of gas cells present at the commencement of the dough rising process, the finer will be the crumb texture, provided the small gas cells retain their identity and do not coalesce to form a smaller number of larger gas cells. Where such coalescence occurs, and also where only relatively few large holes are present in the dough shortly after mixing, the baked bread will show a coarse texture.

The desired product, of course, is that having an even structured fine texture, giving a light baked bread.

To facilitate the desired distribution and abundance of the ultimate gas cells according to the present invention it is essential that "seeding cells" are present before the gas evolution. Whipping, aided by a "whipping agent" as proposed by the present invention is instrumental in the propagation of "seeding cells".

Thus, the underlying concept of the present invention is that it is possible to prepare loose structured bread from starches that do not contain natural gluten provided that a "whipping agent" and gluten substitute gum are added when the dough is prepared.

Furthermore to ensure the coherence of the bread, and the preservation of the extended form when the baked product is cooling, it is preferred to also supplement the bake mix with a "binding agent" such as gelatin, agar agar, instant gelatin and carrageenen.

In the mixes of the present invention the role of the starch is to give the main body of the baked goods and the major caloric value. The starch with the aid of the other agents gives the mass the properties of the dough. The starch particles should be attracted and attain a certain strength, thus giving the dough system the plastic properties.

The other ingredients namely the gluten-substitute, whipping agents and binding agents are added in order to bind the starch granules to a certain strength and to be effective in producing bread from non-wheat materials.

Thus mixes according to the present invention preferably will comprise about 50 to about 80 wt % of said starch, about 0.5 to about 5 wt % of said gluten-substitute gum and about 8 to about 20% of said whipping agent and especially preferred mixes will also comprise about 0.5 to about 10% of a binding agent.

The specific role of the "gluten-substitute" is to create viscosity in the water phase to form a coherent system able to retain the leavening gas and to increase the water-binding capacity of the system. Gluten B is an insoluble binding agent which attracts starch particles around it and cross links with other starch surrounded gluten particles, thus giving an excellent elastic network for entrapping gas and rising dough. It is to be noted that the listed gluten substitutes cannot in themselves replace the gluten perfectly since they do not have the same elastic and binding characteristics as those of gluten. Therefore, they could not give the dough the same properties as gluten gives and the resultant bread quality will be inferior, brittle and lower rising. To supplement for gluten effectively, it is necessary to add additional ingredients as well.

The addition of a whipping agent brings about a remarkable change in the starch dough. Resistance during mixing is considerably reduced, while tendency of the dough at rest to become more fluid is likewise considerably lessened. The air bubbles during mixing form stable air pockets for seeding and the gas retention property of the dough increases accompanied by a considerable improvement of the quality of the bread.

The binding agent is preferred to complement the contribution of the gluten-substitute by elevating the elasticity of the dough, by keeping the load intact and stable and by facilitating thin slicing. Intact slices are especially important in bread type products for their use in preparing satisfactory sandwiches, for spreading and for tasting.

Using the above-mentioned primary ingredients various mixed for cakes anc bread-type products can be prepared with the addition of other standard ingredients known perse in the art and the choice and grade of said other ingredients in a complete mix are not critically related to the invention and may follow standard practice in the art.

Thus any of the usual basic gas producing chemical leavening substances, e.g. as mentioned in U.S. Pat. Nos. 3,170,795 and 2,478,618 as well as flavorings etc. will be also incorporated in said mixes.

While the invention will now be described in connection with certain preferred embodiments in the following examples to that it may be more fully understood, it is not intended to limit the invention to these particular embodiments. On the contrary it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLES 1–3

| Preparation of a loaf of sponge bread weighing 500 gr. | | | |
| --- | --- | --- | --- |
|  | #1 | #2 | #3 |
| cornflour | 200 g | 200 g | 200 g |
| xanthan gum (Keltrol) | 7 g | 6 g | 5.5 g |
| Whipping agent base | 60 g | 55 g | 55 g |
| sugar | 25 g | 25 g | 25 g |

-continued

Preparation of a loaf of sponge bread weighing 500 gr.

| | #1 | #2 | #3 |
|---|---|---|---|
| Glycerine | 1 g | — | — |
| Gelatine | — | 10 g | 5 g |
| Albumen | 5 g | — | 3 g |
| Egg powder | 15 g | 15 g | 15 g |
| Salt | 3 g | 4 g | 2.5 g |
| Gluconodelta lactone | 14 g | 14 g | 14 g |
| Sodium bicarbonate | 6 g | 6 g | 6 g |
| Kimel flavis (caraway seed flavor) | — | 1 g | 2 g |

Each mixture of above ingredients is respectively blended with 200 ml water and whipped for 3 minutes, and then baked for approximately 50 min. at 175° C.

EXAMPLES 4–6

Preparation of a loaf of compact bread, weighing 500–600 gr.

| | #4 | #5 | #6 |
|---|---|---|---|
| Cornflour (or rice flour) | 300 g | 300 g | 300 g |
| Xanthan gum (Keltrol) | 6 g | — | — |
| Pregelatinized starch | | 7 g | |
| Carboxymethyl cellulose | | | 6 g |
| Whipping agent base | 50 g | | |
| Spray-dried margarine | | 45 g | |
| Spray dried butter | | | 40 g |
| Gelatine | 10 g | 5 g | |
| Alginate | | | 5 g |
| Sugar | 25 g | 20 g | 15 g |
| Albumen | 5 g | 5 g | 5 g |
| Egg powder | 15 g | 15 g | 15 g |
| Salt | 4 g | 3 g | 2 g |
| Gluconodeltalactone | 14 g | | |
| Sodium bicarbonate | 6 g | | |
| Yeast | | 35 g | 30 g |

Each mixture of above ingredients is respectively blended with 200 ml water and then baked for 45–60 min. at 170°–180° C.

EXAMPLES 7–9

Preparation of cake mixes

| | Example 7 Almond Cake | Example 8 Vanilla cake | Example 9 Chocolate Cake |
|---|---|---|---|
| Whipping agent base | 50 g | 50 g | 50 g |
| cornflour | 200 g | — | — |
| Potato starch | — | 200 g | — |
| Tapioca starch | — | — | 200 g |
| Xanthan gum (Keltrol) | 4 g | 4 g | 4 g |
| Egg Powder | 15 g | 15 g | 15 g |
| Albumen | 5 g | 5 g | 5 g |
| Gluconodeltalactone | 14 g | 14 g | 14 g |
| Sodium bicarbonate | 6 g | 6 g | 6 g |
| Almond flavor | 2 ml | — | — |
| Vanilla flavor | — | 0.3 g | 0.2 g |
| Cocoa powder | — | — | 17 g |
| Chocolate flavor | — | — | 0.2 g |
| Cream flour | — | — | 0.2 g |

Each mixture of above ingredients is respectively blended with 200 ml water, whipped for 3 min. and the batter placed in a cake-pan and baked for 55 min. at 175° C.

It will be evident to those skilled in the art that the invention is not limited to the details of the foregoing illustrative embodiments and examples and that the present invention may be embodied in other specific forms without departing from the essential attributes thereof, and it is therefore desired that the present examples be considered in all respects as illustrative and not restrictive, reference being made to the appended claims, rather than to the foregoing description, and all changes which come with the meaning and range of equivalency of the claims are therefore intended to be embraced therein.

What is claimed is:

1. A mix for the preparation of bread and cake products comprising a non-wheat-based starch, a gluten-substitute gum, and an emulsified-fat, powdered whipping agent, said non-wheat-based starch being present in an amount of about 50 to 80 wt. % of said mix, said gluten-substitute gum being present in sufficient amount to create viscosity in and form a coherent dough system upon the addition of water, and able to retain leavening gas formed during preparation of said dough; and said whipping agent being present in sufficient amounts to propagate seeding cells in a dough formed from said mix, and also increase the gas retention properties of the dough, and wherein said products are produced in the substantial absence of wheat flour.

2. A mix according to claim 1 wherein said starch is obtained from the group consisting of corn flour, rice flour, soybean flour, potato flour, tapioca flour, cassava flour, sweet potato flour and yams.

3. A mix according to claim 1 wherein said gluten-substitute gum is selected from the group consisting of xanthan gum, guar gum, locust-bean gum, alginate, pregelatinized starch and carboxymethylcellulose.

4. A mix according to claim 1 wherein said emulsified fat powdered whipping agent is selected from the group consisting of spray dried margarine, spray dried butter, spray dried cream, vegetable lipid whipping agents and combinations thereof.

5. A mix according to claim 1 further comprising a binding agent.

6. A mix according to claim 5 wherein said binding agent is selected from the group consisting of gelatin, instant gelatin, agar agar and carrageenen.

7. A mix according to claim 1 comprising about 50 to about 80 wt % of said starch, about 0.5 to about 5 wt % of said gluten-substitute gum and about 8 to about 20% of said whipping agent.

8. A mix according to claim 1 comprising about 50 to about 80 wt % of said starch, about 0.5 to about 5 wt % of said gluten-substitute gum, about 8 to about 20% of said whipping agent and about 0.5 to about 10% of a binding agent.

* * * * *